US006934218B1

(12) United States Patent
Chen

(10) Patent No.: US 6,934,218 B1
(45) Date of Patent: Aug. 23, 2005

(54) SOUNDING DEVICE FOR SHOWING ITS LOCATION ON A FISH DETECTOR

(76) Inventor: Hwang-Hsing Chen, 7649 Grassland Dr., Fort Worth, TX (US) 76133

( * ) Notice: Subject to any disclaimer, the term of this patent is extended or adjusted under 35 U.S.C. 154(b) by 0 days.

(21) Appl. No.: 10/767,532

(22) Filed: Jan. 29, 2004

(51) Int. Cl.[7] .............................................. G01S 15/96
(52) U.S. Cl. ......................................................... 367/2
(58) Field of Search ............................. 367/99, 97, 95, 367/2, 111

(56) References Cited

U.S. PATENT DOCUMENTS

| | | | | | |
|---|---|---|---|---|---|
| 4,597,069 | A | * | 6/1986 | Milano et al. | 367/95 |
| 4,641,455 | A | * | 2/1987 | Johnson | 43/42.13 |
| 4,888,904 | A | * | 12/1989 | Douglas, Jr. | 43/17.6 |
| 5,177,891 | A | * | 1/1993 | Holt | 43/17.1 |
| 5,260,912 | A | * | 11/1993 | Latham | 367/88 |
| 5,495,689 | A | * | 3/1996 | Cassem | 367/107 |
| 5,651,209 | A | * | 7/1997 | Rainey | 43/17.5 |
| 6,628,569 | B1 | * | 9/2003 | Steiner et al. | 367/111 |
| 6,724,688 | B2 | * | 4/2004 | Betts et al. | 367/99 |
| 6,768,701 | B1 | * | 7/2004 | Cummings et al. | 367/109 |
| 6,771,562 | B2 | * | 8/2004 | Betts et al. | 367/111 |

* cited by examiner

*Primary Examiner*—Daniel Pihulic

(57) ABSTRACT

A sounding device for showing its location on a sonar fish detector including a sonar wave receiving unit (10) to detect the sonar signal, a sonar wave producing unit (20) to simulate the reflection of the sonar wave from the fish, a control unit (30) to regulate the function of the wave receiving and producing units through on-off switches (12) and (22), and a power supply (40) to provide the electricity for the sounding device. The control unit may also receive command remotely from a sonar fish detector or a remote controller to turn on/off the sounding device as well as to perform other functions.

12 Claims, 5 Drawing Sheets

SOUNDING DEVICE FOR SHOWING ITS LOCATION ON A FISH DETECTOR

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of sonar detector and more specifically to a sounding device for showing its location on a fish detector. This invention relates generally to the field of the fish detector and more specifically to a sounding device for showing its location on a fish sonar detector.

Fish sonar detectors have been invented and used in the fishing and the research of the underwater lives for a long time. According to Kelvin Hughes the history of echo detection of fish began with the recordings of cod made by Oscar Sund in 1935 in the Norwegian Fisheries Research Ship Johan Hjort. Since then the detection of fish by ultrasonic means has since become standard practice in every commercial fishing industry in the world. Many new improvements on sonar detectors have been invented to increase its accuracy and portability. Now most sport fishermen are using small and portable fish finders to facilitate the fishing.

A number of prior arts were disclosed to improve fishing. U.S. Pat. No. 5,495,689 disclosed a fish finder and pole assembly that the sonar wave is transmitted from the outer end of the flexible pole and the direction of the sonar wave can be controlled by the user. U.S. Pat. No. 5,260,912 disclosed a side-looking fish finder. U.S. Pat. No. 4,888,904 disclosed a fishing lure with LCD bait that uses LCD device to display images of various forms of natural fish baits to lure fish. U.S. Pat. No. 5,177,891 disclosed game fish attracting device that produces signature of the fish bait to lure fish. U.S. Pat. No. 4,641,455 disclosed sonic fishing bait that produces sounds wave and U.S. Pat. No. 5,651,209 discloses fish attractor that includes a scent dispenser for gradually dispensing a fish attracting chemical to attract fish. However none of the prior art is capable of improving fishing by helping the user to place the bait near fish.

Most modern fish detectors for sport fishing are capable showing the locations of the underwater fish. This information helps fishermen to place the baits to the location of the fish. However none is useful to help fishermen to place baits properly to the best location near the fish. Fish are likely to bite the baits nearby and the chance of success in fishing increases when the baits were placed next to fish. It is obviously that the location of the baits is important to decide the efficiency of the fishing. If the locations of the baits and fish are shown on the fish detector any fishermen can easily adjust the baits to near the fish and therefore greatly increase the efficiency of the fishing. However no prior technology are properly designed for this purpose. Most fish detectors have different sensitivity setting. On the low sensitivity setting the detectors show only large fish. On the high sensitivity setting the detectors show a number of small objects including shrimps, small fish, baits and noises as well as large fish. It is difficult to tell the difference of the baits from other small objects. Therefore it will be helpful if a small device can be placed near the bait and generate sonar reflection at the strength that can be easily detected at either high sensitivity or low sensitivity setting on a sonar detector. It will be more helpful if a small device can generate a specific sonar signal that is different from that reflects from fish and can be easily distinguished on a conventional sonar detector or a modified sonar detector. It will be also very useful in the studies of the underwater life. By attachment the sounding device on the underwater targets scientific researcher can study their activities by following their signals on a fish sonar detector.

BRIEF SUMMARY OF THE INVENTION

The primary object of the invention is to provide a device to reflect sound waves and show its accurate location under the water on a fish detector means.

Another object of the invention is to provide a method to place baits near fish to facilitate fishing.

Another object of the invention is to provide a method for luring fish to the baits to facilitate fishing.

A further object of the invention is to provide a method to research the underwater lives by placing said device on the target and monitoring its accurate location on a sonar detector means.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a sounding device for showing its location on a sonar fish detector means comprising: 1. A wave receiving means sensitive to frequencies of said sonar detector means 2. A wave producing means capable of producing waves of at least one of said frequencies of said sonar detector means 3. A control means connecting said wave-producing means and said wave-receiving means and capable of turning on and off said wave producing means and said wave-receiving means independently or simultaneously, and 4. A power means to provide the electricity of said wave-receiving means, said wave producing means and said controlled means.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. This invention relates generally to the field of fish sonar detectors and more specifically to a sounding device for showing its location on a fish sonar detector.

Figure 1:
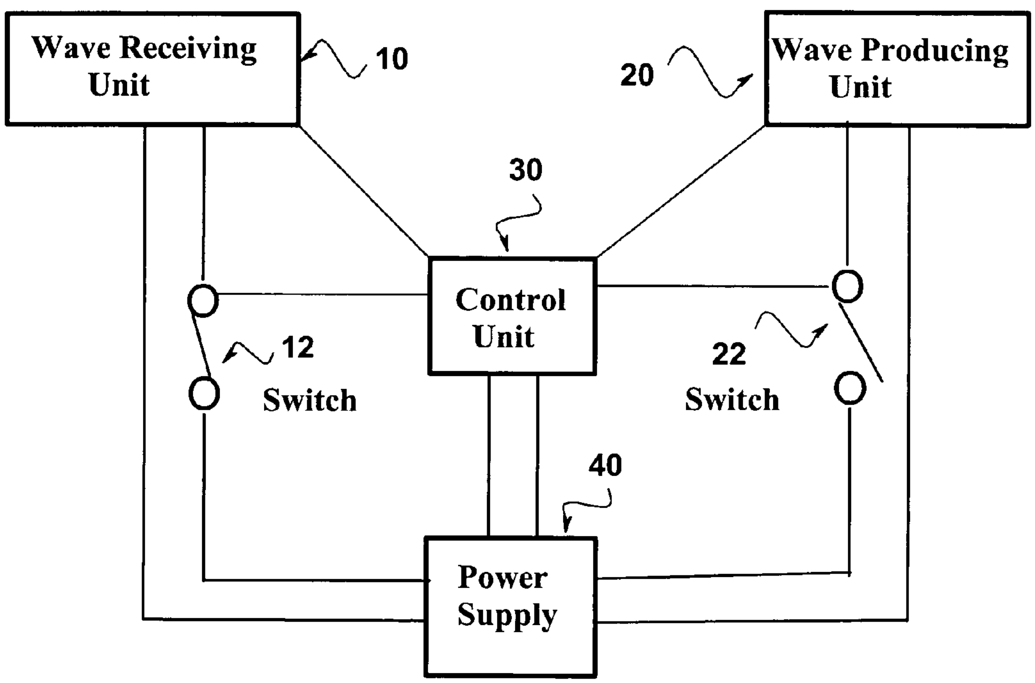
FIG. 1 is a schematic diagram illustrating the parts of the invention.

In accordance with the present invention, FIG. 1 shows the sounding device comprising a wave receiving unit 10, a wave producing unit 20, a control unit 30 connecting the unit 10 and the unit 20 and a switch 12 for the unit 10 and a switch 22 for the unit 20, and a power unit 40 to provide the electricity for the sounding device.

Figure 2:
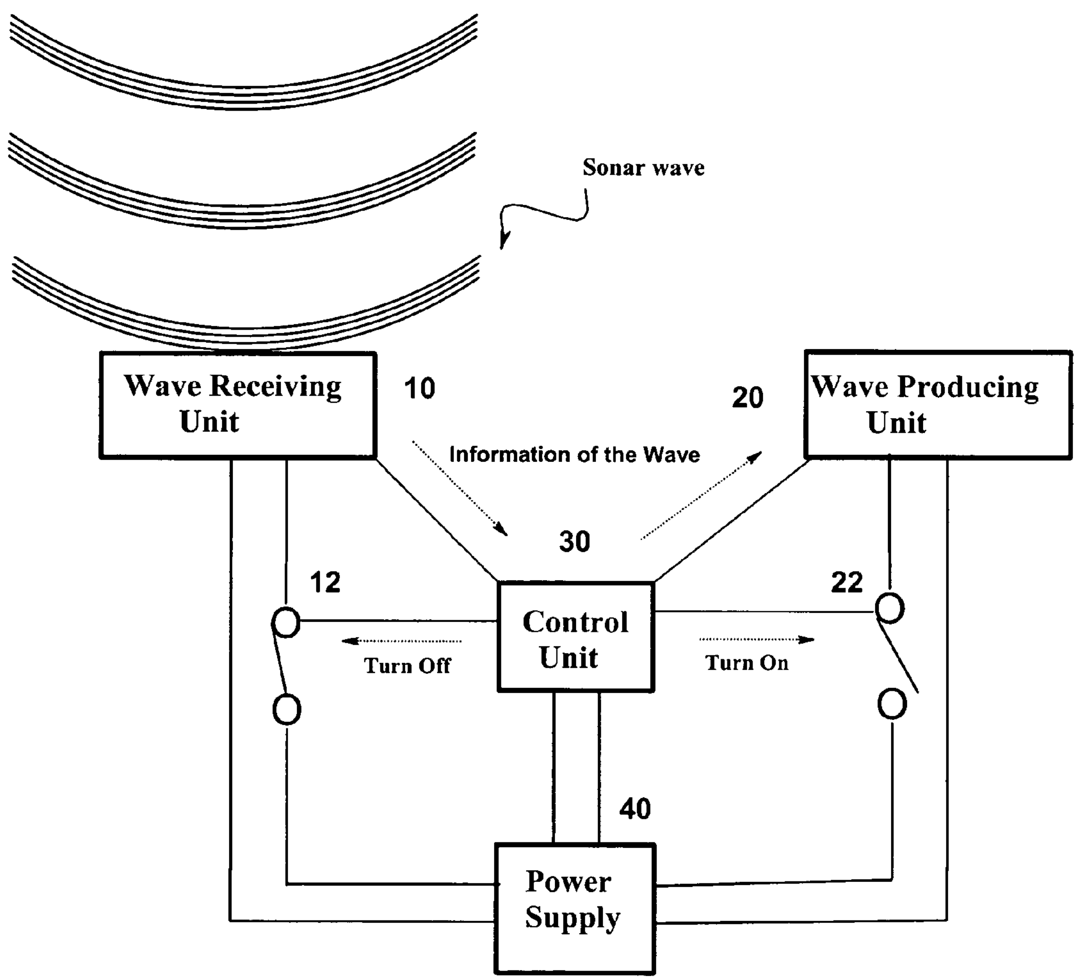
FIG. 2 is a schematic diagram illustrating the first stage of the operation of the invention.

FIG. 2 shows when sonar signal is received by the receiving unit 10 the control unit will turn off the switch 12 to shut down the power to the receiving unit 10 and simultaneously turn on the switch 22 to activate the sound producing unit 20 to emit the same sonar signal with suitable strength to simulate the reflecting sonar signal of a underwater object and show its accurate location on the sonar detector. When the sounding device is placed closely by the bait, the location of the bait can be shown on the detector. Fishermen can then easily move the bait close to the fish accurately by the help of the sonar detector.

Figure 3:
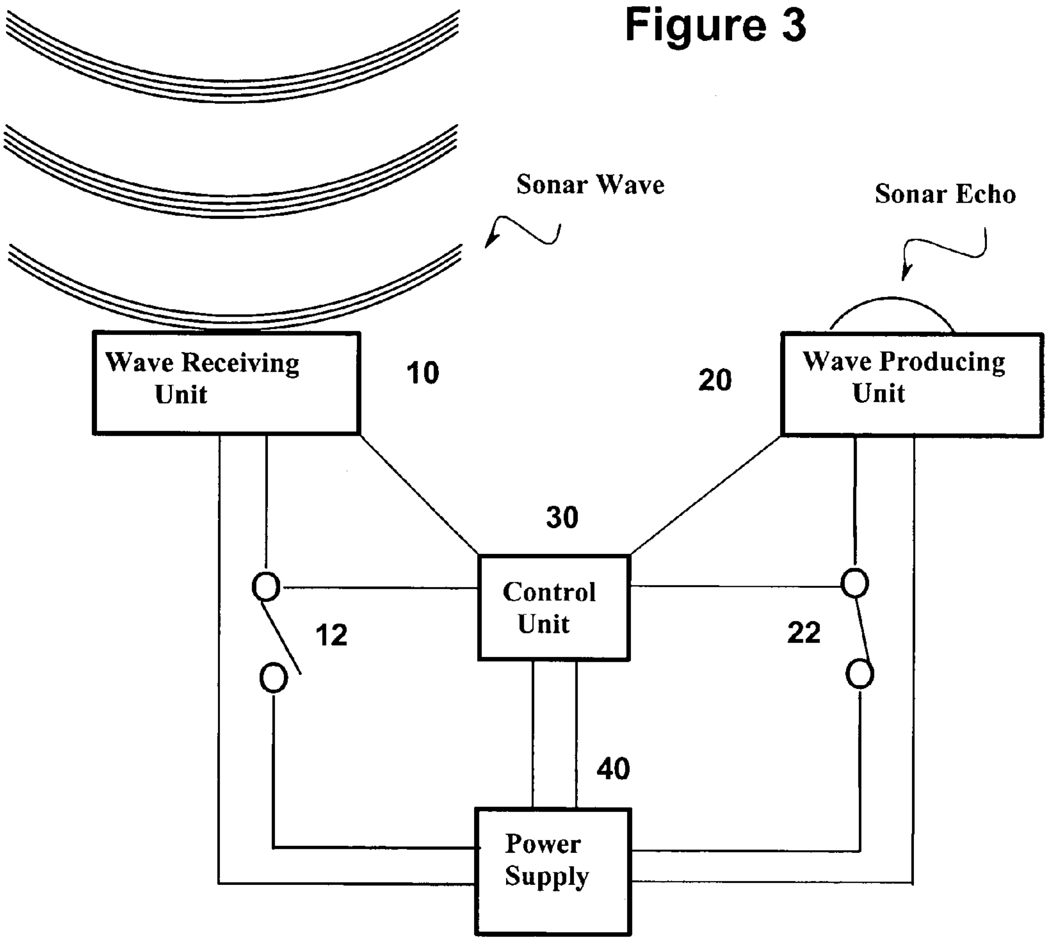
FIGS. 3 and 4 are schematic diagrams illustrating the second stage of the operation of the invention.
Figure 4:
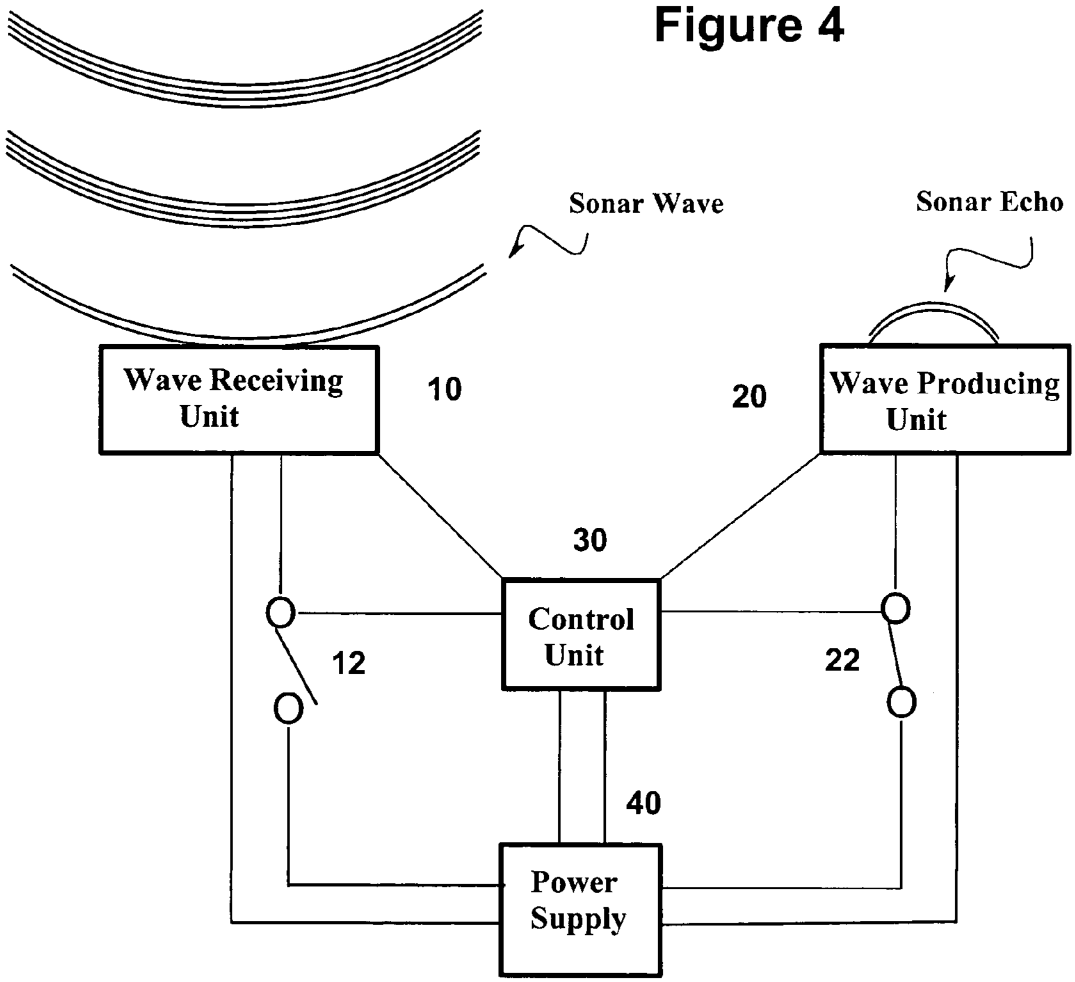

FIGS. 3 and 4 show the sounding device emits the sonar signal for a short period based on the duration of the common signal pulse of fish detector. At the end of the period the control unit 20 turns off the switch 22 and turns on the switch 12 simultaneously or stepwise.

Figure 5:
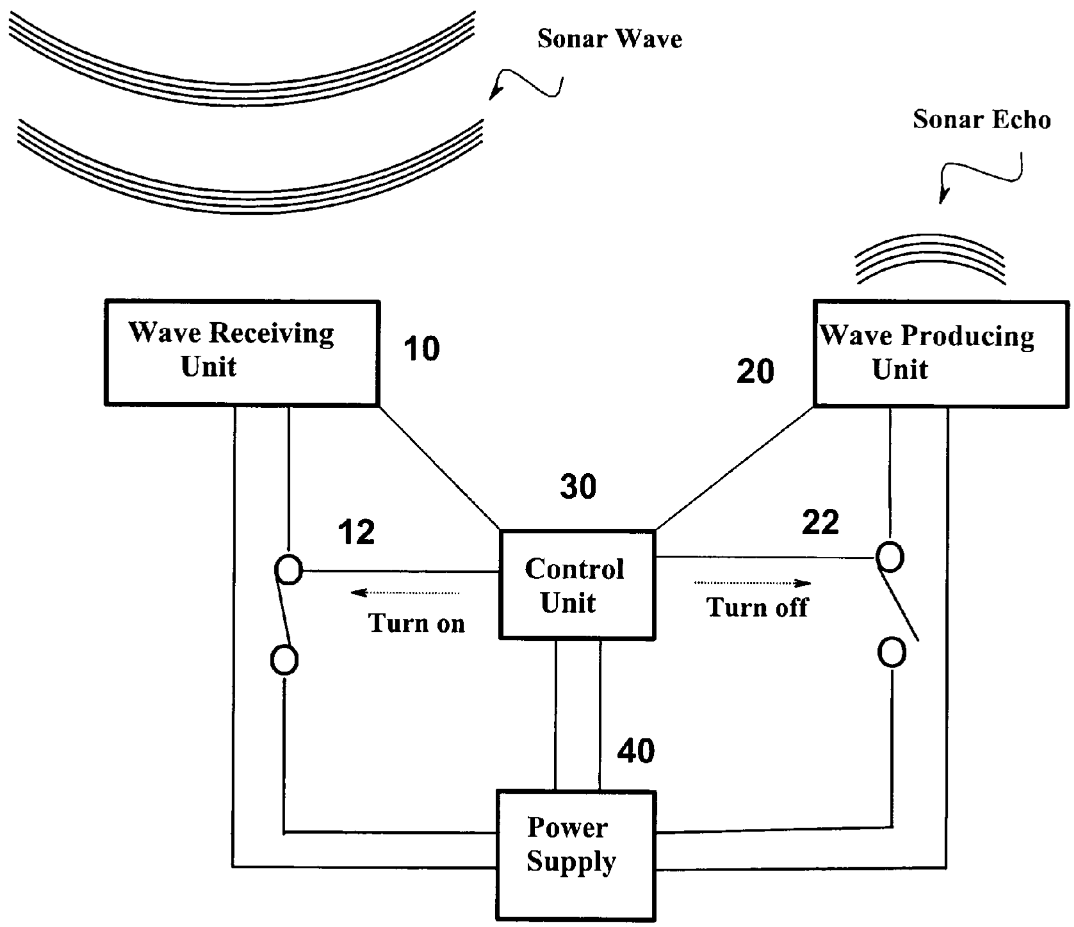
FIG. 5 is a schematic diagram illustrating the final stage of the operation of the invention.

FIG. 5 shows the sounding device has been reset to its original state and waiting for the next cycle of the sonar pulse.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A sounding device for showing its location on a sonar detector means comprising:

a) a wave receiving means sensitive to frequencies of said sonar detector means;

b) a wave producing means capable of producing waves of at least one of said frequencies of said sonar detector means;

c) a control means connecting said wave producing means and said wave receiving means and capable of turning on and off said wave producing means and said wave receiving means independently or simultaneously; and d) a power means to provide the electricity of said wave-receiving means, said wave-producing means and said controlled means.

2. A sounding device as claimed in claim 1 wherein said control means capable of turning on said wave producing means and turning off said wave receiving means simultaneously when a sonar signal is detected by said wave receiving means and capable of controlling said wave producing means to generate said sonar waves for a period at a power lever equal or greater than the sonar wave reflects from a median size of fish before turning off said wave producing means and turning on said wave receiving means; whereby reset said sounding device to its original state before the next sonar pulse arrives.

3. A sounding device as claimed in claim 1 wherein said wave producing means capable of generating sonar echo for a variable of time period and at different power level that can be controlled by said control means or said fish sonar detector.

4. A sounding device as claimed in claim 1 wherein said control means capable of controlling said wave receiving means to respond to one of the frequencies of said sonar detector means and generate one of the different frequencies of said sonar detector means simultaneously; whereby said sonar detector means can distinguish the echo of the device from that of fish.

5. A sounding device as claimed in claim 1 further comprising at least one water tight housing means to accommodate said wave receiving means, said wave producing means, said control means and said power means.

6. A sounding device as claimed in claim 1 wherein said sounding device has a volume size of equal or less than 125 cubic centimeter; whereby said sounding device can be conveniently carried and placed by a fishing bait.

7. A sounding device as claimed in claim 1 wherein said power means including turbines means which turns and produces electricity when said sounding device moves under the water.

8. A sounding device as claimed in claim 1 wherein said control means capable of distinguishing said sonar waves from the background waves by the signal/noise (S/N) ratio and the pulse cycle of said sonar waves before turning on said sound producing means of said sounding device.

9. A sounding device as claimed in claim 1 wherein said control means capable of distinguishing said sonar waves and waiting for a few pulse cycles of said sonar waves from the background waves by the signal/noise (S/N) ratio and before turning on said sound producing means of said sounding device; whereby greatly increases the accuracy of said sounding device.

10. A sounding device as claimed in claim 1 wherein said control means capable of receiving commands from a remote controller or said sonar detector to execute specific functions.

11. A sounding device as claimed in claim 1 wherein said wave-producing means capable of producing sonar echo of specific patterns; whereby more than one of said sounding devices can be used at the same time and be distinguished by conventional fish sonar detectors or modified fish sonar detectors.

12. A sounding device as claimed in claim 1 wherein said wave-producing means capable of producing sonar echoes which is different in patterns, strength or duration from sonar echoes reflected from fish; whereby said fish detector can distinguish the echoes of fish from that of a bait.

* * * * *